(12) United States Patent
Mielenz et al.

(10) Patent No.: US 10,809,070 B2
(45) Date of Patent: Oct. 20, 2020

(54) METHOD AND DEVICE FOR DETERMINING THE LOCATION OF A VEHICLE

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 43 days.

(21) Appl. No.: 16/095,047

(22) PCT Filed: Mar. 17, 2017

(86) PCT No.: PCT/EP2017/056425
§ 371 (c)(1),
(2) Date: Oct. 19, 2018

(87) PCT Pub. No.: WO2017/198358
PCT Pub. Date: Nov. 23, 2017

(65) Prior Publication Data
US 2019/0101396 A1    Apr. 4, 2019

(30) Foreign Application Priority Data
May 18, 2016   (DE) .................. 10 2016 208 488

(51) Int. Cl.
*G01C 21/30*      (2006.01)
*G01C 21/20*      (2006.01)
(Continued)

(52) U.S. Cl.
CPC .............. *G01C 21/30* (2013.01); *B60Q 1/04* (2013.01); *B60Q 1/24* (2013.01); *G01C 21/20* (2013.01); *B60Q 2300/45* (2013.01); *G01S 13/931* (2013.01); *G01S 15/931* (2013.01); *G01S 17/931* (2020.01); *G01S 2013/9323* (2020.01);
(Continued)

(58) Field of Classification Search
None
See application file for complete search history.

(56) References Cited

U.S. PATENT DOCUMENTS

| 9,063,548 | B1 | 6/2015 | Ferguson et al. |
| 9,731,645 | B1 * | 8/2017 | Taleb-Bendiab ............... G08G 1/096716 |
| 2010/0188864 | A1 * | 7/2010 | Raghunathan ......... B60Q 1/085 362/466 |

FOREIGN PATENT DOCUMENTS

| DE | 202010002800 U1 | 6/2010 |
| DE | 102014011811 A1 | 2/2016 |

OTHER PUBLICATIONS

International Search Report for PCT/EP2017/056425, dated Jun. 22, 2017.

* cited by examiner

*Primary Examiner* — Tamara L Weber
(74) *Attorney, Agent, or Firm* — Norton Rose Fulbright US LLP; Gerard Messina

(57) ABSTRACT

A method and device for determining the location of a vehicle, including reading in first position data values which represent a position of an environmental feature in the environment of the vehicle, controlling a lighting unit of the vehicle as a function of the read-in first position data values, to adjust an illumination of the environmental feature, and determining second position data values, which represent a position of the vehicle, based on the position of the environmental feature, whose illumination is adjusted by the lighting unit of the vehicle.

11 Claims, 3 Drawing Sheets

(51) Int. Cl.
*B60Q 1/24* (2006.01)
*B60Q 1/04* (2006.01)
*G01S 13/931* (2020.01)
*G01S 15/931* (2020.01)
*G01S 17/931* (2020.01)

(52) U.S. Cl.
CPC ............... *G01S 2013/9324* (2020.01); *G01S 2013/93271* (2020.01)

METHOD AND DEVICE FOR DETERMINING THE LOCATION OF A VEHICLE

FIELD OF THE INVENTION

The present invention relates to a method and a device for determining the location of a vehicle, the location being determined based on an environmental feature in the environment of the vehicle, and the illumination of the environmental feature being adjusted for that.

BACKGROUND INFORMATION

Patent document DE 20 2010 002 800 U1 discusses a lighting device for a motor vehicle, the lighting device featuring a light module having at least one main light source for producing a main-light distribution, such that at least one additional light source is disposed in the light module for illuminating a near field between the main light distribution and the motor vehicle.

SUMMARY OF THE INVENTION

The method according to the present invention for determining the location of a vehicle includes a step of reading in first position data values which represent a position of an environmental feature in the environment of the vehicle, a step of controlling a lighting unit of the vehicle as a function of the read-in first position data values in order to adjust an illumination of the environmental feature, and a step of determining second position data values, which represent a position of the vehicle, based on the position of the environmental feature, whose illumination is adjusted by the lighting unit of the vehicle.

The advantage of the invention is that no additional sensors are used to localize the vehicle. Instead, existing sensors may be employed, by purposely adjusting the illumination of a specific environmental feature, so that already existing sensors are able to determine a location based on this environmental feature.

The first position data values may be read in in a manner that the position data values are obtained from a map which includes the environmental feature, or in a manner that the position data values are received from an external server.

This reflects the advantage that the illumination is not implemented haphazardly, that is, does not have to take place ad hoc, but rather the illumination may be planned and initiated in good time, so that the location may then also be determined as quickly as possible. In addition, environmental features may be selected which permit the location to be determined faster, more efficiently and more reliably.

The lighting unit may be controlled in such a way that the environmental feature is illuminated at least proportionally by the lighting unit.

In one especially specific embodiment, the lighting unit is controlled in such a way that the environmental feature is illuminated proportionally by the lighting unit at least to the extent that the environmental feature is able to be sensed by at least one sensor of the vehicle.

This is particularly advantageous, since the illumination is thus adjusted in such a way that sensors already available permit a reliable localization, based on the environmental feature. This is a basic requirement for guaranteeing safe travel of a vehicle, especially an automated vehicle, since many driver assistance functions, especially during automated driving, are dependent on the most exact position possible of a vehicle within a locating system.

In one especially specific embodiment, the second position data values are determined in a manner that the at least proportionally illuminated environmental feature is sensed by the at least one sensor of the vehicle, and relative position data values, which represent a position of the vehicle relative to the position of the sensed environmental feature, are thereby determined, which are linked to the first position data values.

The advantage is that, given precise knowledge of the position of the environmental feature, the vehicle is localized quickly and reliably, since the position of the vehicle is no longer determined absolutely, e.g., by GPS, but rather relative to the environmental feature.

The relative position data values may include the distance between the vehicle and the sensed environmental feature and/or the direction of movement of the vehicle relative to the sensed environmental feature and/or the velocity of the vehicle.

The advantage here is that the distance and/or the velocity and/or the direction of movement relative to the environmental feature is/are able to be determined quickly and exactly with the aid of sensors of the vehicle, since the location of the vehicle is easy to determine based on the environmental feature.

The device according to the present invention for determining the location of a vehicle includes first means (reading unit) for reading in first position data values which represent a position of an environmental feature in the environment of the vehicle, second means (controlling unit) for controlling a lighting unit of the vehicle as a function of the read-in first position data values in order to adjust an illumination of the environmental feature, and third means (determining unit) for determining second position data values, which represent a position of the vehicle, based on the position of the environmental feature, whose illumination is adjusted by the lighting unit of the vehicle.

The reading (first) unit for reading in is so configured that the first position data values are obtained from a map that includes the environmental feature, or the position data values are received from an external server.

The controlling (second) unit for controlling the lighting unit is configured so that the environmental feature is illuminated at least proportionally by the lighting unit, or the environmental feature is illuminated proportionally by the lighting unit at least to the extent that the environmental feature is able to be sensed by at least one sensor of the vehicle.

In one especially specific embodiment, the determining (third) unit to determine the second position data values may be configured so that the at least proportionally illuminated environmental feature is sensed by the at least one sensor of the vehicle, and relative position data values, which represent a position of the vehicle relative to the position of the sensed environmental feature, are thereby determined, which are linked to the first position data values.

The determining (third) unit to determine the second position data values may be configured so that the relative position data values include the distance between the vehicle and the sensed environmental feature and/or the direction of movement of the vehicle relative to the sensed environmental feature and/or the velocity of the vehicle.

Advantageous further developments of the invention are stated in the further description herein.

Exemplary embodiments of the present invention are represented in the drawings and explained in greater detail in the following description.

DETAILED DESCRIPTION

Figure 1:
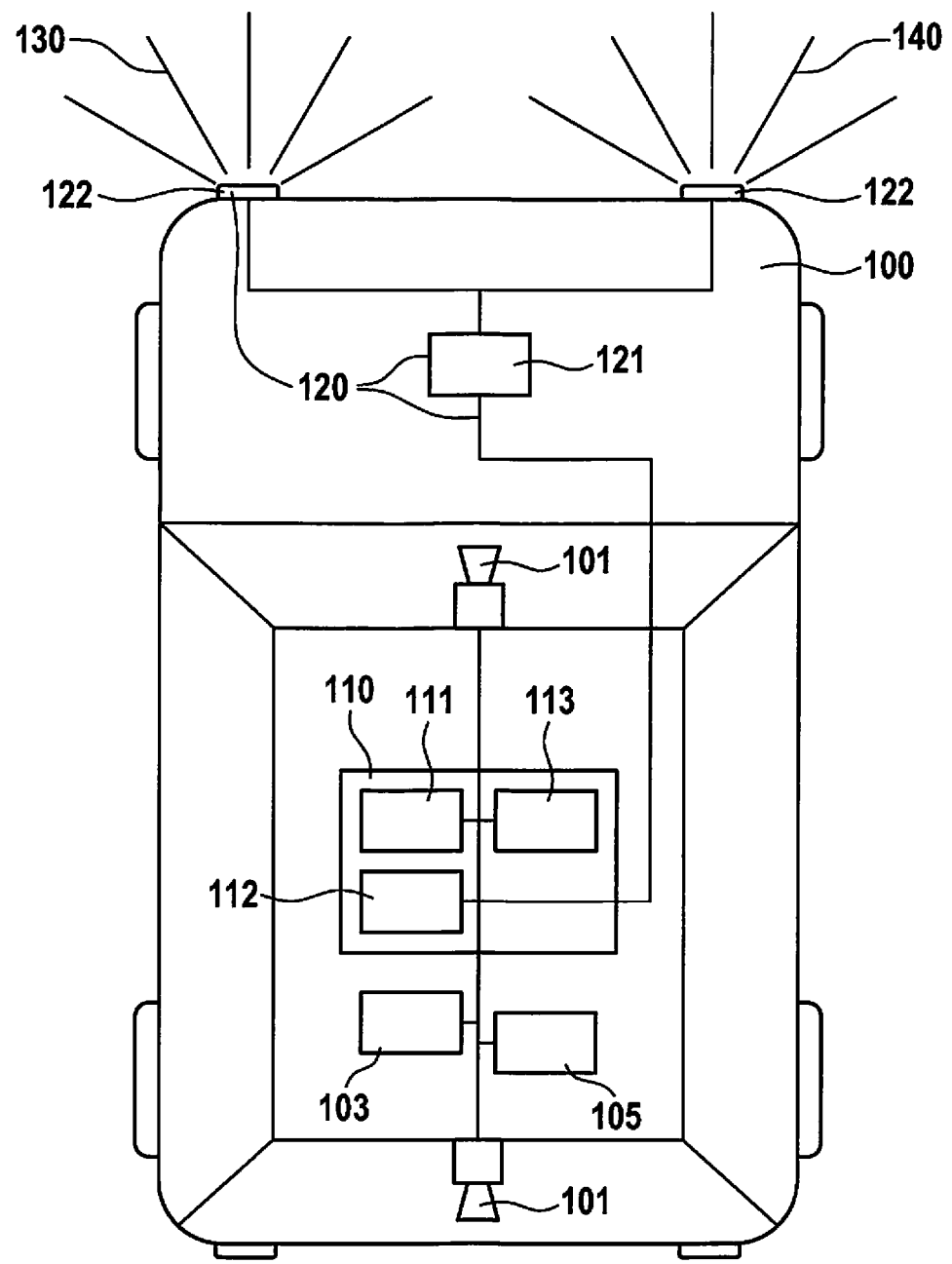
FIG. 1 shows a vehicle, purely by way of example, which carries on it the device according to the present invention for implementing the method of the present invention.

FIG. 1 shows a vehicle 100, which includes device 110 according to the present invention. Vehicle 100 also includes a lighting unit 120 which here, again purely by way of example, includes a control unit 121, headlights 122 and connecting lines between headlights 122 and control unit 121, as well as connections between control unit 121 and device 110 according to the invention.

In addition, vehicle 100 includes sensors 101, which purely by way of example, are represented here as video sensors. Sensors 101 may also be other types of sensors like, for example, radar-, lidar- or ultrasonic sensors, which are provided to sense environmental features 200 in the area surrounding vehicle 100. In addition, sensors 101 shown illustratively here also stand for other types of sensors such as acceleration sensors or movement sensors, which are provided to sense a movement and/or a velocity of vehicle 100.

Moreover, vehicle 100 includes a map 105, a map to be understood here as a navigation system, for example, which carries with it map material, such that environmental features 200 are contained in the map. Alternatively, map 105 may be a memory in which map data is stored. In general, a map 105 for the purposes of the method according to the present invention may be understood to be anything which includes environmental features 200 as well as their position, able to be retrieved with the aid of first means 111, for example.

In addition, vehicle 100, as shown here illustratively, may include a transceiver 103 which enables it to request and receive map data, according to the preceding section, from an external server. For example, it may be a smartphone (or other devices which are able to transmit and receive data), that is connected by a wireless connection such as Bluetooth, or with the aid of a cable to device 110 according to the present invention.

Furthermore, map 105, especially in the form of a navigation system, and/or transceiver 103 is/are used to determine a rough position of the vehicle, e.g., with the aid of GPS. If vehicle 100 now approaches a specific environmental feature 200, which is recognized with the aid of a map 105 of a navigation system, this is able to be sensed by a sensor 101 of the vehicle. The sensing process may also be understood to mean the determination of the coordinates of environmental feature 200.

Device 110 of the present invention includes first means 111 for reading in first position data values which represent a position of environmental feature 200 in the environment of vehicle 100. In this context, first means 111 is configured in such a way that they have access to map 105, in which environmental features 200 are stored. In addition, first means 111 may also be configured in such a way that they request and read in data, which include environmental features 200 as well as their positions, with the aid of transceiver 103. When an environmental feature 200, together with its position, has been read in, a corresponding signal is made available to second means 112, the signal including information such that second means 112 is able to influence lighting unit 120 of vehicle 100, in order to adjust illumination 130, 140 of environmental feature 200.

Device 110 of the present invention also includes second means 112 for controlling a lighting unit 120 of vehicle 100. In this context, the control is carried out in such a way that illumination 130, 140 of an environmental feature 200 is adjusted as a function of the previously acquired first position data values.

The adjustment of illumination 130, 140 of environmental feature 200 is to be understood, for example, as a movement of a headlight 122, which is implemented in such a way that environmental feature 200 becomes better illuminated than previously, allowing a video sensor 101 of vehicle 100, for instance, to sense environmental feature 200. Furthermore, the adjustment may also be understood to mean that illumination 130, 140 is reduced, since environmental feature 200 is a reflecting object. Because of the reduction, environmental feature 200 is better able to be sensed, for example, since video sensor 101 is no longer overexposed.

Device 110 of the present invention also includes third means 113 for determining second position data values, which represent a position of vehicle 100, based on the position of environmental feature 200, whose illumination 130, 140 is adjusted by lighting unit 120 of vehicle 100. In this context, third means 113 is configured in such a way that, employing one or more sensors 101, they detect environmental feature 200 and determine a position of vehicle 100 based on detected environmental feature 200.

In the process, for example, the distance between vehicle 100 and environmental feature 200 is determined with the aid of video sensors 101, in a manner that an image is acquired, and the image is subsequently evaluated accordingly by third means 113. In so doing, the distance may be determined, for instance, employing ratios of sizes known in advance. A further possibility for determining the distance may be with the use of a lidar sensor and/or an ultrasonic sensor, for example, their use also being dependent on the respective range of sensor 101. In general, a plurality of sensors of different types may also be used, which mutually plausibilize each other.

In addition, a movement of vehicle 100 relative to environmental feature 200 may be determined with the use of acceleration- and/or movement- and/or video- and/or velocity sensors. After the relative position has been determined, a position of vehicle 100 is subsequently determined with the aid of third means 113, in a manner that the known position of environmental feature 200 is expanded by the relative position of vehicle 100 as a function of environmental feature 200.

For example, employing a program, the position of environmental feature 200 may be recorded as coordinates in a coordinate system, and the relative movement or the relative position of vehicle 100, given by the distance and/or direction of movement and or velocity, may be recorded as vector in this coordinate system. By adding the vector to the coordinates of environmental feature 200, the position of vehicle 100 is subsequently determined in the same coordinate system.

Both first means 111, as well as second means 112 and third means 113 may fall back upon existing devices in vehicle 100, such as a control unit, but also may take the form of independently operating arithmetic logic units. To that end, first, second and third means 111, 112, 113 include a processor, a memory unit as well as a random-access memory, for example.

Figure 2:
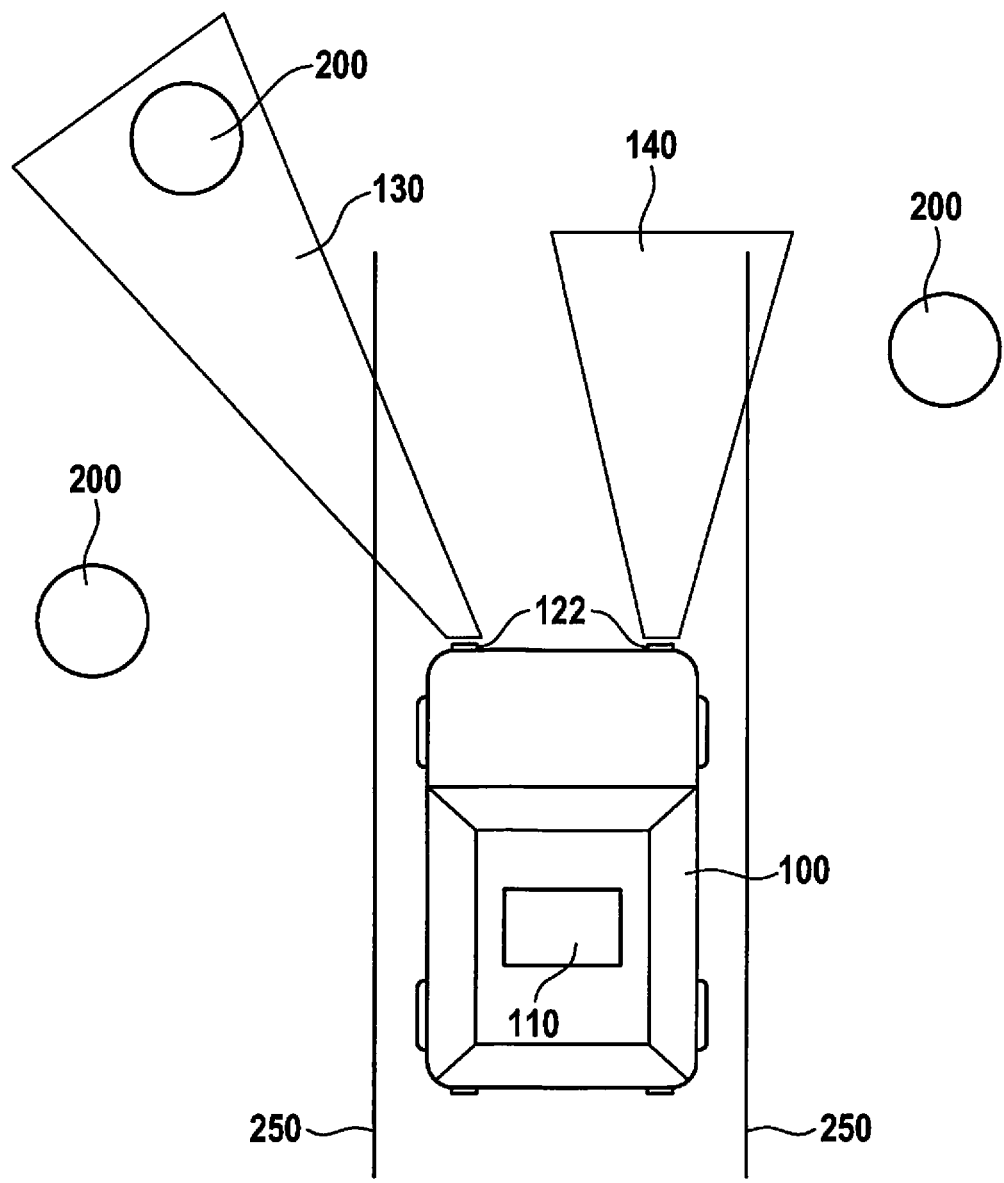
FIG. 2 shows an exemplary embodiment, purely by way of example, of the method according to the present invention.

FIG. 2 shows an exemplary embodiment of the method according to the present invention. In this case, vehicle 100 is on a roadway, indicated here by the two road edges 250. Vehicle 100 includes device 110 of the present invention as well as two lights 122, which here as part of lighting unit 120 of vehicle 100, are shown purely by way of example as headlights. In principle, any light of vehicle 100 like, for example, also the taillights, may be utilized to carry out the method of the present invention.

Alongside the roadway, to the left and to the right, are three environmental features 200. For example, environmental features 200 shown here illustratively may be buildings, features of the traffic infrastructure such as traffic lights or guardrails, features of the landscape such as lakes, hills, woods or individual trees, and other objects which are able to be sensed by a sensor 101 of vehicle 100. In this context, it is crucial for the method of the present invention that each environmental feature 200 together with its position is stored in a map 105 or is able to be called up from an external server.

Based on the knowledge of environmental features 200 located in the sensor range of vehicle 100, an illumination area 130 of one headlight is now adjusted in such a way that one environmental feature 200 is able to be sensed by a video sensor 101, for example. By virtue of environmental feature 200 thus sensed, the position of vehicle 100 is then determined with the aid of third means 113. At the same time, illumination area 140 of the other headlight in this exemplary embodiment continues to be directed forward in the direction of travel of vehicle 100.

Figure 3:
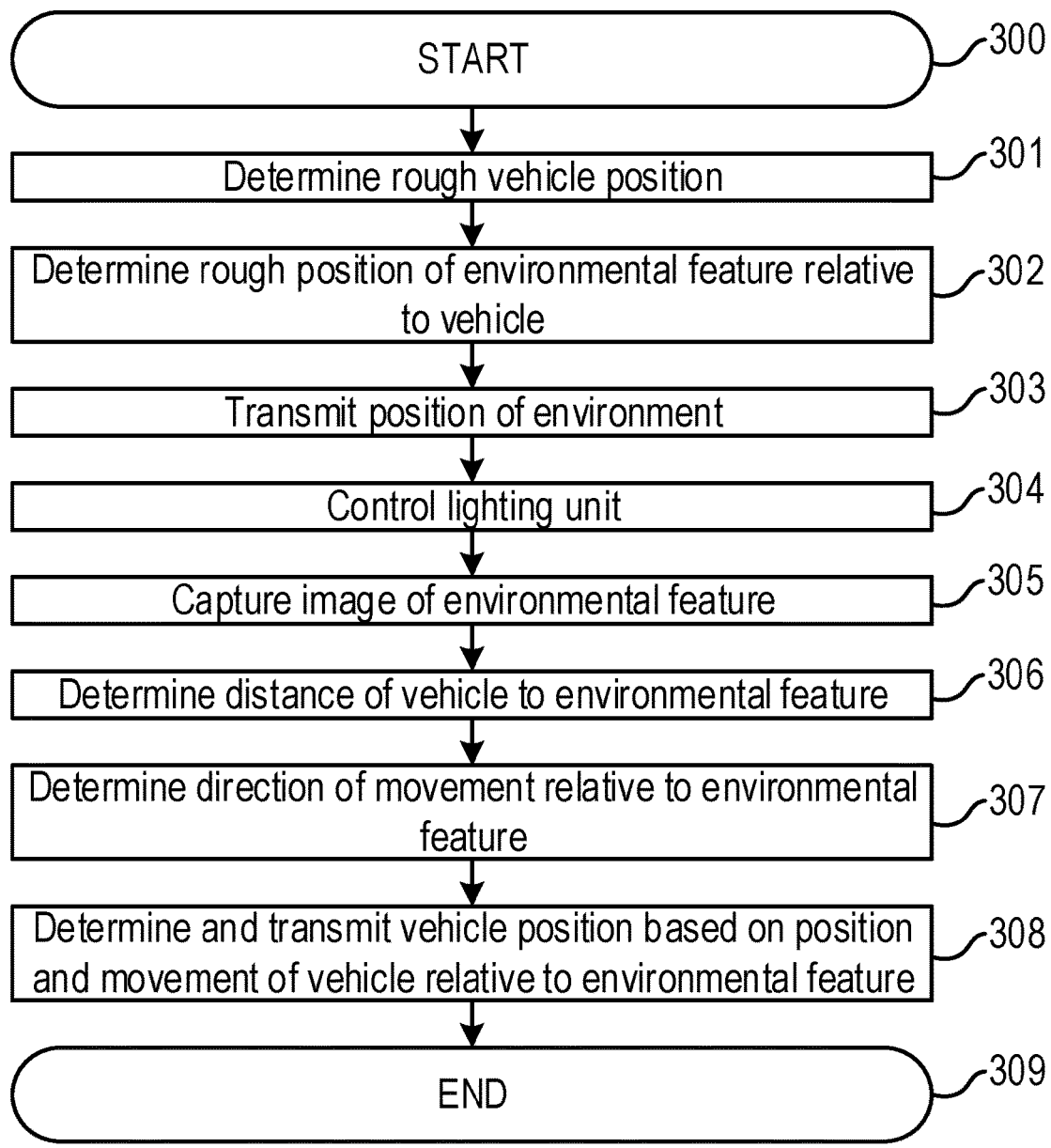
FIG. 3 shows an exemplary embodiment, purely by way of example, in the form of a flowchart of the method according to the present invention, using the devices of the present invention.

FIG. 3 shows an exemplary embodiment of the method according to the present invention in the form of a flowchart.

In step 300, the method begins. This may occur, for example, because a driver assistance function of the vehicle requires an extremely accurate position of vehicle (100) in order to properly perform its function. The knowledge of an extremely accurate position is of great importance especially for automated vehicles.

In step 301, a rough position of vehicle 100 is determined, e.g., with the aid of a map 105 of a navigation system. For instance, this may be implemented in the form of GPS data. For example, a rough position may be understood here to be a certain area where the vehicle is without knowing the exact position.

In step 302, based on the knowledge of the rough position of vehicle 100, environmental features 200 in the vicinity of the vehicle, which in addition are located in the range of at least one sensor 101 of vehicle 100, are determined with the aid of first means 111.

In step 303, the position of one of environmental features 200 which is a possibility for the method of the present invention is transmitted to second means 112.

In step 304, lighting unit 120 of vehicle 100 is controlled as a function of the position of possible determined environmental feature 200 in such a way that this environmental feature is illuminated, for example, so that this environmental feature 200 is able to be sensed by a video sensor 101.

In step 305, environmental feature 200 is captured by a video sensor 101 in the form of an image.

In step 306, with the aid of third means 113, a distance 210 between vehicle 100 and environmental feature 200 is determined from the image.

In step 307, in addition to distance 210 between vehicle 100 and environmental feature 200, a direction of movement 220 of the vehicle relative to environmental feature 200 is determined by a movement sensor 101.

In step 308, from distance 210 and direction of movement 220 of vehicle 100, a relative position of vehicle 100, based on environmental feature 200, and thus the actual position of vehicle 100 is determined, e.g., in the coordinate system of environmental feature 200, and transmitted to the driver assistance function.

In step 309, the method ends.

Naturally, further exemplary embodiments and mixed forms of the examples presented are also possible.

What is claimed is:

1. A method for determining a location of a vehicle, the method comprising:

obtaining first position data values that represent a position of the vehicle at a first accuracy;

based on read-in position data regarding a static environmental feature in an environment of the vehicle, identifying a position of the environmental feature relative to the position of the vehicle represented by the first position data values;

controlling a light of the vehicle, as a function of the identified position of the environmental feature relative to the position of the vehicle represented by the first position data values, to adjust an illumination of the environmental feature so that the environmental feature is in a sensing state in which the environmental feature can be sensed by a sensor;

the sensor sensing the environmental feature in the sensing state;

identifying a position of the vehicle relative to the position of the environmental feature based on the sensing of the environmental feature; and determining second position data values that represent the position of the vehicle, at a second accuracy that is higher than the first accuracy, based on the position of the vehicle relative to the position of the environmental feature identified based on the sensing of the environmental feature.

2. The method of claim 1, wherein the read-in position data regarding the environmental feature are read in from a map that includes the environmental feature or from an external server.

3. The method of claim 1, wherein the identifying of the position of the vehicle relative to the position of the environmental feature includes identifying a distance between the vehicle and the sensed environmental feature, a direction of movement of the vehicle relative to the sensed environmental feature, and/or a velocity of the vehicle.

4. The method of claim 1, wherein the illumination is in a manner that is tailored to characteristics of the environmental feature.

5. The method of claim 4, wherein the light is controlled so that the environmental feature is illuminated by the light at least proportionally to a reflectivity of the environmental feature.

6. The method of claim 4, wherein the tailoring of the illumination is performed to maximize an ability of the sensor to sense the environmental feature.

7. A device for determining a location of a vehicle, the device comprising:

a sensor;

a light and a processor, wherein the processor is configured to:
- obtain first position data values that represent a position of the vehicle at a first accuracy;
- based on read-in position data regarding a static environmental feature in an environment of the vehicle, identify a position of the environmental feature relative to the position of the vehicle represented by the first position data values; and
- control the light, as a function of the identified position of the environmental feature relative to the position of the vehicle represented by the first position data values, to adjust an illumination of the environmental feature so that the environmental feature is in a sensing state in which the environmental feature can be sensed by the sensor;
- identify a position of the vehicle relative to the position of the environmental feature based on a sensing of the environmental feature by the sensor when the environmental feature is in the sensing state; and
- determine second position data values that represent the position of the vehicle, at a second accuracy that is higher than the first accuracy, based on the position of the vehicle relative to the position of the environmental feature identified based on the sensing of the environmental feature.

8. The device of claim 7, wherein the read-in position data regarding the environmental feature are read in from a map that includes the environmental feature or, via a receiver of the device, from an external server.

9. The device of claim 7, wherein the identification of the position of the vehicle relative to the position of the environmental feature includes identifying a distance between the vehicle and the sensed environmental feature, a direction of movement of the vehicle relative to the sensed environmental feature, and/or a velocity of the vehicle.

10. The device of claim 7, wherein the processor is configured to control the light to perform the illumination in a manner that is tailored to characteristics of the environmental feature.

11. The device of claim 10, wherein the processor is configured to control the light so that the environmental feature is illuminated by the light proportionally to a reflectivity of the environmental feature or the tailoring of the illumination is performed to maximize an ability of the sensor to sense the environmental feature.

* * * * *